United States Patent Office 3,469,907
Patented Sept. 30, 1969

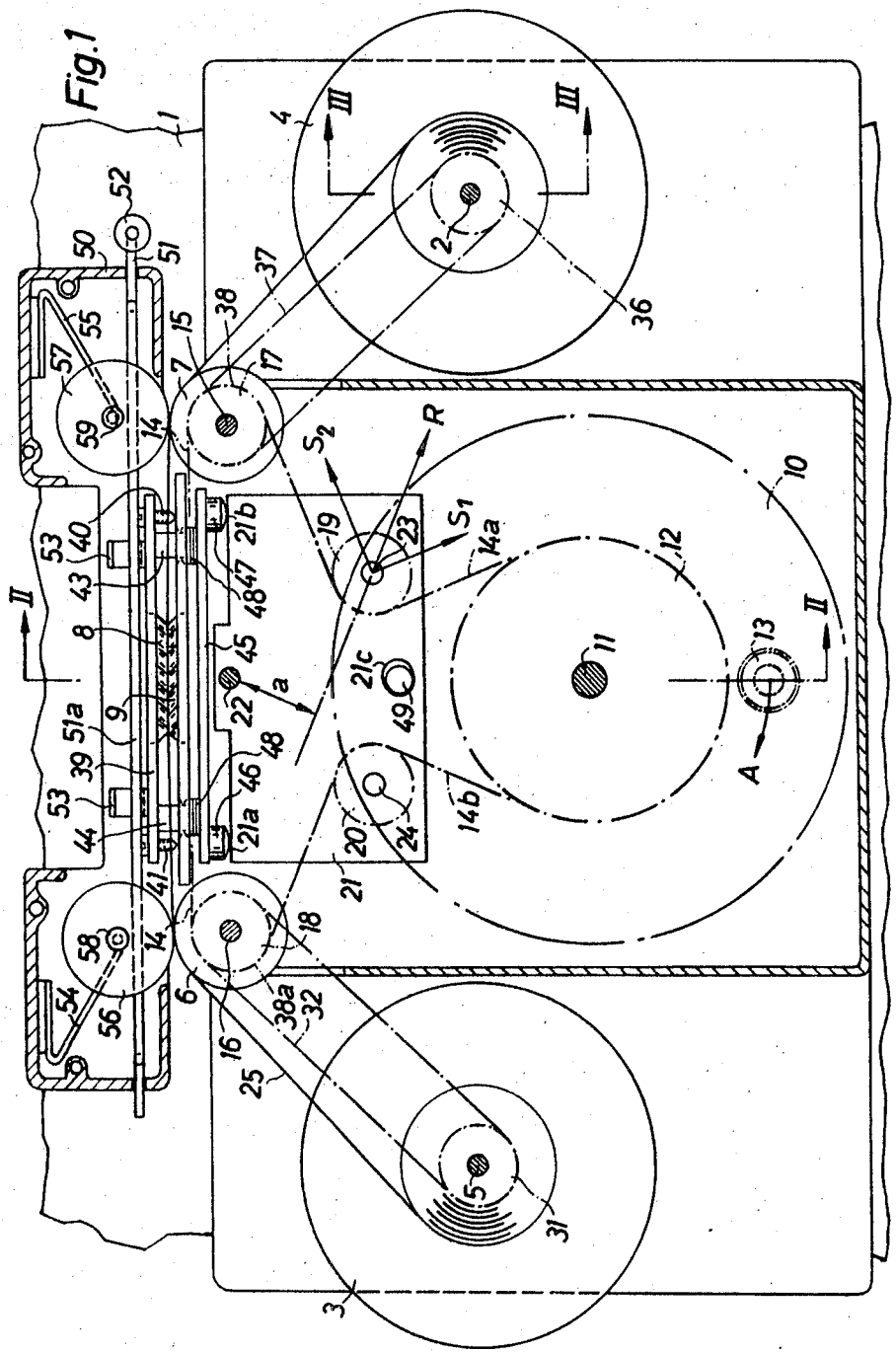

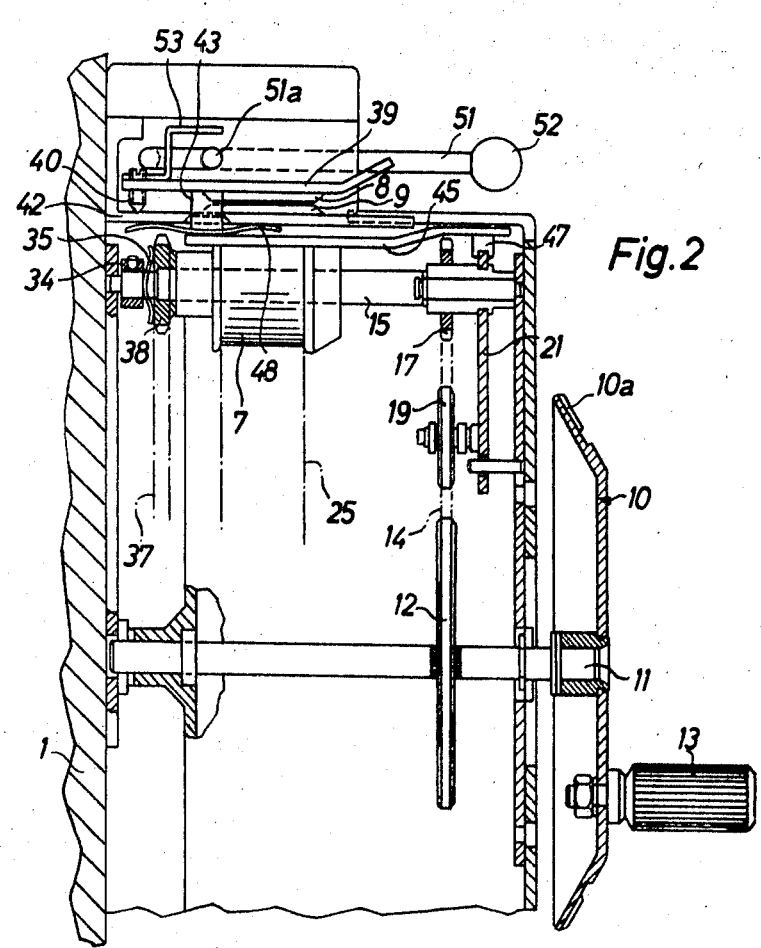
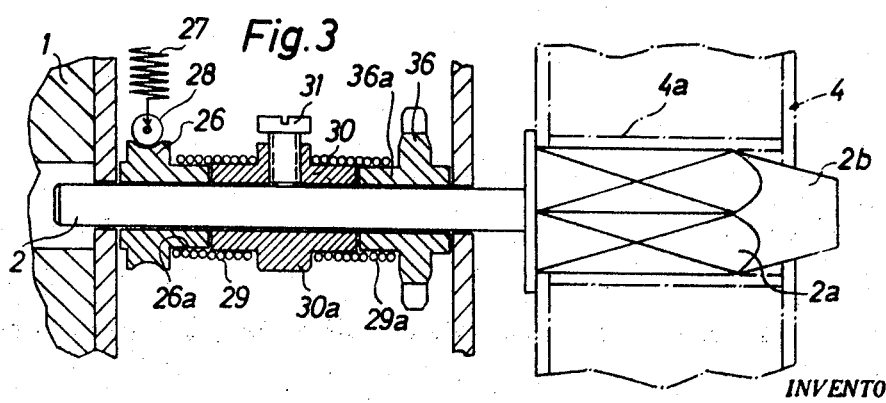

3,469,907
**FILM GUIDING AND TRANSPORTING MECHA-
NISM FOR MICROFILM READERS**
Hans-Ado Brandt, Munich, Germany, assignor to Agfa-
Gevaert A.G., Leverkusen, Germany
Filed Mar. 7, 1967, Ser. No. 621,208
Claims priority, application Germany, Mar. 26, 1966,
A 51,983
Int. Cl. G03b 1/48
U.S. Cl. 352—225                                    13 Claims

ABSTRACT OF THE DISCLOSURE

A film guiding and transporting mechanism for microfilm readers. The film is transported from a supply reel to a takeup reel, or vice versa, and passes through a film channel between a fixed and a movable pressing plate. The movable pressing plate is automatically moved away from the fixed pressing plate when the film transporting unit is set in motion, either by hand or by means of a motor, so that the film is not scratched during travel from one of the reels toward the other reel, or vice versa. The drive of the film transporting unit includes an endless chain which can rock a two-armed lever, and such rocking of the lever causes movement of the movable pressing plate away from the fixed pressing plate.

BACKGROUND OF THE INVENTION

The present invention relates to improvements in a mechanism which is utilized to transport roll film and to place selected portions of the film into an optimum position for projection of images onto a screen. More particularly, the invention relates to a combined film guiding and transporting mechanism which can be utilized with advantage in microfilm readers or the like.

It is well known to provide a microfilm reader with two reels one of which serves as a supply reel and the other of which serves as a takeup reel for microfilm, or vice versa. A transporting unit is provided to advance microfilm lengthwise in a direction from one of the reels toward the other reel until a selected portion of the film enters a film gate and is thus placed into registry with the optical system so that the image of such portion can be projected onto a screen. As a rule, the transporting unit is arranged to advance microfilm at a high speed so that little time is wasted in locating a selected portion which contains the desired information. Since the scale of reduction is normally between 1:10 and 1:50, that portion of the microfilm which has been moved into the film gate must be located with a high degree of precision because, otherwise, the enlarged image which is projected onto the screen will be blurred and will be difficult to read or interpret. Therefore, microfilm readers of recent design invariably comprise a transparent film gate which places selected portions of microfilm into a predetermined plane and holds such selected portions against curling during projection of images. On the other hand, such accurate positioning of film in the gate necessitates the provision of a relatively narrow film channel so that the film is likely to be scratched during travel along the component parts of the gate.

Attempts to solve the problem of accurately positioning the film in a film gate and of preventing scratching of film during travel from the supply reel to the takeup reel include the provision of manually operated pressing plates which are moved away from the film path prior to actuation of the film transporting unit. Such manual operation of pressing plates is not entirely satisfactory because a careless operator might forget to reset the pressing plate, either before or subsequent to actuation of the film transporting unit.

Accordingly, it is an important object of the present invention to provide a film guiding and transporting mechanism which is constructed and assembled in such a way that a portion of the film which happens to be located in the film gate is automatically placed into an optimum position for projection of its image when the film transporting unit is idle and that the film is released by the component parts of the gate when the transporting unit is in operation.

Another object of the invention is to provide a mechanism of the just outlined characteristics which can be utilized with particular advantage in a microfilm reader and which is constructed and assembled in such a way that it can advance the film back and forth and that the film is invariably free to travel with reference to the gate when the transporting unit is in operation.

A further object of the invention is to provide a film guiding and transporting mechanism wherein movements of component parts of the film gate into and from engagement with the film are incidental to operation of the film transporting unit so that a single prime mover suffices to bring about all such movements which are necessary to advance the film, to prevent spillage of film during travel, and to properly locate that portion of the film which is received in the gate.

An additional object of the invention is to provide a mechanism of the above outlined characteristics which invariably maintains a portion of the film in a position to facilitate intelligent observation of projected images, even at such times when the film is advanced lengthwise, so that the operator can observe the images while the film travels and that the operator can arrest the drive of the film transporting unit when a selected portion of the film enters the gate.

A concomitant object of the invention is to provide a novel film transporting unit for use in a microfilm reader or in a photocopier.

An ancillary object of the invention is to provide a novel film gate for use in a microfilm reader or in a photocopier.

SUMMARY OF THE INVENTION

One feature of my invention resides in the provision of a film guiding and transporting mechanism which is particularly suited for use in microfilm reader sand serves to transport the film lengthwise and to place selected portions of the film into a position for projection of selected images onto a screen. In its simplest form, the improved mechanism comprises a rotary reel arranged to accommodate a supply of convoluted film, a film transporting unit which can include a prime mover in the form of a motor or a hand-actuated member and is operative to withdraw the film from the reel and to advance the thus withdrawn film in a predetermined film path, a film guiding unit or gate which is adjacent to a portion of the film path and includes a preferably transparent pressing member movable to and from an operative position of engagement with a portion of the film in which the thus engaged film portion is maintained in a predetermined plane and its image is accurately focussed on the screen when the projection lamp is turned on, and motion transmitting means automatically responsive to operation of the transporting unit to move the pressing member from operative position and to thus permit unimpeded withdrawal of film from the reel. The motion transmitting means receives motion directly from the film transporting unit.

The mechanism preferably includes two reels one of which collects the film that is being withdrawn from the other reel, or vice versa, and the transporting unit is then of the reversible type so that it can advance the film from either one of the reels toward the other reel. The motion transmitting means is responsive to operation of the transporting unit in either of the two senses and invariably disengages the movable pressing member from the film when the transporting unit is operated.

The novel features which are considered as characteristic of the invention are set forth in particular in the appended claims. The improved film guiding and transporting mechanism itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary longitudinal vertical sectional view of a microfilm reader which embodies the film guiding and transporting mechanism of my invention;

FIG. 2 is a transverse vertical sectional view as seen in the direction of arrows from the line II—II of FIG. 1; and FIG. 3 is an enlarged fragmentary sectional view as seen in the direction of arrows from the line III—III of FIG. 1.

DESCRIPTION OF THE PREFERRED EMBODIMENTS

Referring first to FIGS. 1 and 2, there is shown a microfilm reader which comprises a housing or casing 1. This housing supports two spaced parallel spindles 2 and 5 which respectively carry reels 4 and 3. The film 25 is being advanced from the reel 3 to the reel 4, or vice versa, and is being convoluted on the cores of the respective reels. Thus, each of the reels 3 and 4 may be used as a supply reel or as a take-up reel. The transporting unit for the film 25 comprises two driven film advancing rolls 6 and 7 which normally cooperate with two freely rotatable presser rolls 56, 57. The drive means of the transporting unit includes a prime mover here shown as a hand wheel 10 which is mounted on a shaft 11 and carries a handle 13. Precision adjustments of the hand wheel 10 can be effected by grasping a knurled portion 10a which is provided along the marginal portion of this wheel. The shaft 11 is journalled in the housing 1 substantially midway between and in parallelism with the spindles 2, 5 and carries a sprocket wheel 12 for an endless chain 14. It is to be noted that the sprocket wheel 12 can be replaced by a pulley and that one or more endless bands or belts can be substituted for the chain 14. The latter drives two sprocket wheels 17, 18 which are affixed to the shafts 15, 16 of the film advancing rolls 7, 6. The chain 14 is further trained around two tensioning sprocket wheels 19, 20 mounted on shafts 23, 24 which are carried by a rockable motion transmitting plate 21 constituting an important component of the motion transmitting means. The plate 21 is fulcrumed on a pivot pin 22 which is affixed to the housing 1. It can be said that the plate 21 constitutes a two-armed lever each arm of which carries one of the sprocket wheels 19, 20. As clearly shown in FIG. 1, the chain 14 can tilt or rock the plate 21 in a clockwise or in a counterclockwise direction, depending on the direction of rotation of the hand wheel 10. For example, and if the operator grasps the handle 13 to rapidly rotate the handwheel 10 in a clockwise direction (see the arrow A in FIG. 1), the film 25 will normally offer some resistance to transport by the driven rolls 6, 7 and will tension the chain portion or stretch 14a which causes the sprocket wheel 19 to move in the direction indicated by arrow R so that the plate 21 is tilted in a counterclockwise direction, as viewed in FIG. 1. The arrow R indicates the direction of the tilting force which is a resultant of forces S1 and S2, these forces being parallel with such portions of the stretch 14a which are tangential to the sprocket wheel 19. Each of the three forces intersects the axis of the shaft 23. The effort arm of the resultant force is shown at a.

If the hand wheel 10 is rotated in a counterclockwise direction, the plate 21 will be tilted in a clockwise direction, as viewed in FIG. 1, for reasons which will be readily apparent upon perusal of the preceding disclosure. During such clockwise tilting of the plate 21, the stretch 14b of the chain 14 displaces the sprocket wheel 20.

When the operator rotates the hand wheel 10 in a counterclockwise direction, as viewed in FIG. 1, the film 25 is being payed out by the reel 4 and is being convoluted onto the core of the reel 3. The reel 4 is then the supply reel and must be braked to avoid spilling of film 25 on its way to the reel 3. The braking device for the spindle 2 of the reel 4 is shown in FIG. 3 and comprises a brake disk 26 which is rotatable on the spindle 2. The periphery of this disk 26 is engaged by a suitable shoe 28 which is biased thereagainst by a relatively strong helical spring 27. The disk 26 is adjacent to a sleeve 30 which is provided with a centrally located flange 30a and is affixed to the spindle 2 by a screw 31. A helical spring 29 operates between the flange 30a and the brake disk 26. The lead of the spring 29 is such that its diameter diminishes when the reel 4 pays out the film 25 whereby the convolutions of the spring 29 grip the cylindrical external surface 26a of the disk 26 and couple the latter to the sleeve 30. Since the shoe 28 opposes rotation of the disk 26, the entire reel 4 is braked and prevents spillage of film during travel toward the reel 3. When the spindle 2 rotates in the other direction, the convolutions of the spring 29 release the cylindrical surface 26a so that the braking device offers little or no resistance to rotation of the reel 4 in a sense to take up the film 25.

The spindle 2 will be positively driven when the reel 4 serves as a takeup reel. The drive means includes a sprocket wheel 36 which is rotatable on the spindle 2 and is adjacent to the right-hand axial end of the sleeve 30, as viewed in FIG. 3. A second helical spring 29a operates between the sleeve 30 and hub 36a of the sprocket wheel 36, and the lead of this spring 29a is opposite that of the spring 29. Thus, the convolutions of the spring 29a will contract around the hub 36a when the sprocket wheel 36 is rotated in a sense to wind the film onto the core 4a of the reel 4. At the same time, the spring 29a will engage the cylindrical surface of the sleeve 30 and will transmit torque from the sprocket 36 to the spindle 2. The outer end portion 2a of the spindle 2 is of polygonal outline and is nonrotatably fitted into the central opening of the core 4a.

A second braking device (not shown) is provided for the spindle 5 of the reel 3. The manner in which the spindle 5 may be driven when the reel 3 takes up the film 25 is the same as described for the spindle 2 and reel 4 of FIG. 3.

The sprocket wheel 36 is driven by a chain 37 which is trained around a sprocket wheel 38 affixed to the shaft 15. The drive means for the spindle 5 of the reel 3 comprises a chain 32 which is trained around sprocket wheels 31 and 38a, the latter being mounted on the shaft 16. The sprocket wheel 31 is mounted on the spindle 5 in the same way as described in connection with sprocket wheel 36 and spindle 2.

The transmission ratio between the sprocket wheels 17 and 38 on the shaft 15 is selected in such a way that the film 25 is tensioned during travel toward the reel 4, i.e., the sprocket wheel 38 then slips on the shaft 15. The same holds true for the sprocket wheel 38a when the hand wheel 10 is rotated in a sense to advance the film 25 toward the reel 3. The connection between the sprocket wheel 38 and shaft 15 comprises a simple friction clutch which is shown in FIG. 2 and includes a ring 34 affixed to the shaft 15 and a spring 35 which operates between the ring 34 and sprocket wheel 38 and biases the latter against an annular shoulder of the shaft 15.

The exposed ends of the spindles 2 and 5 are of conical shape to facilitate introduction of their polygonal end portions into the cores of the respective reels. This is shown in FIG. 3 wherein the right-hand tip 2b of the spindle 2 is of conical shape.

The film guiding unit or gate comprises two transparent pressing plates 8 and 9. The plate 8 is installed in a frame 39 which carries two adjusting screws 40, 41 abutting against a supporting member or panel 42 which is affixed to the housing 1. The panel 42 further supports the pressing plate 9. The frame 39 is provided with projections or lugs 43, 44 which extend through the panel 42 and connect it with a plate-like motion receiving element 45. This motion receiving element 45 carries two preferably adjustable projections 46, 47 which respectively abut against edge faces 21a, 21b of the motion transmitting plate 21. The edge faces 21a, 21b are located at the opposite sides of the pivot pin 22. The projections 46, 47 may but need not be riveted to the motion receiving element 45 and the latter is biased by two leaf springs 48 which urge the tips of the projections 46, 47 against the edge faces 21a, 21b. The springs 48 also bias the tips of screws 40, 41 against the panel 42.

If the motion transmitting plate or lever 21 is tilted in a clockwise or in a counterclockwise direction, as viewed in FIG. 1, to leave its normal or neutral position, one of is edge faces 21a, 21b displaces the projection 46 or 47. Such displacement of the projection 46 or 47 causes deformation of one of the springs 48 and the frame 39 is tilted about the tip of the screw 40 or 41 to move the transparent pressing plate 8 from operative position, i.e., away from the fixed pressing plate 9. The film 25 is released so that it can be readily transported toward the reel 3 or 4. Pivotal movements of the motion transmitting plate 21 on the pin 22 are limited by a stud 49 which is affixed to the housing 1 and extends with requisite clearance into an aperture 21c of the plate 21. The purpose of the aperture 21c and stud 49 is to prevent excessive movements of film 25 from the plane in which the images are sharply focussed onto a screen, not shown. The optical system of the microfilm reader has been omitted from the drawings because its construction forms no part of the present invention. The normal position of the frame 39 can be adjusted by rotation of screws 40, 41 and is selected with a view to account for the thickness of film 25. The optimum plane for the film is shown in FIG. 1, i.e., the film is then clamped between the transparent pressing plates 8 and 9 of the film gate.

In order to facilitate threading of a fresh film 25 between the pressing plates 8 and 9, the microfilm reader of the present invention is further provided with a cover 50 carrying a locking rod 51. The cover 50 overlies the film platform and the locking rod 51 is provided with an actuating knob 52 and a cranked portion 51a which normally engages one or more hooks 53 affixed to the frame 39. If the rod 51 is turned through 90 degrees with reference to the position shown in FIG. 1, its cranked portion 51a lifts the shafts 58, 59 of the aforementioned presser rolls 56, 57 so that these rolls are moved away from the film advancing rolls 6, 7 against the opposition of leaf springs 54, 55. In response to such turning of the cranked portion 51a, the frame 39 can be moved further away from the fixed pressing plate 9 and the operator has ample room to thread a fresh film into the spaces between the rolls 6, 56 and 7, 57 as well as between the pressing plates 8 and 9. The springs 54, 55 are mounted on the cover 50 and respectively carry the shafts 58, 59.

The pressing plates 8 and 9 define between themselves a film channel which forms part of the film path and is normally just wide enough to accommodate a portion of the film 25. It is desirable to limit movements of the movable pressing plate 8 away from operative position, i.e., away from the fixed pressing plate 9, in such a way that the width of the film channel exceeds very slightly the thickness of the film when the latter is in motion. This is of advantage because the operator can observe successive images when the hand wheel 10 is rotated and the operator can arrest the drive of the film transporting unit when a selected portion of the film enters the gate. The springs 48 always urge the pressing plate 8 to the operative position of FIG. 1 in which the width of the film channel between the pressing plates 8 and 9 equals the thickness of the film 25. The operator can interrupt the transport of film at any time whereby the image on that portion of the film which happens to be clamped between the pressing plates 8 and 9 is sharply focussed onto the screen without necessitating any manipulation of the pressing plate 8 and without necessitating the provision of a separate prime mover for such pressing plate.

The distance between the operative and inoperative positions of the movable pressing plate 8 may be in the range of 0.1–0.2 mm. Such distance is sufficiently small to permit recognition of images during travel of the film 25 in response to rotation of the hand wheel 10, especially if the latter is rotated at a relatively low speed. When the cranked portion 51a of the locking rod 51 is moved to releasing position, the distance between the pressing plates 8 and 9 can be increased to between 1–2 mm. which is ample to permit convenient threading or removal of the film.

It is clear that the hand wheel 10 can be replaced by a motor or the like.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. A film guiding and transporting mechanism, particularly for use in microfilm readers, comprising a rotary reel arranged to accommodate a supply of roll film; a film transporting unit operative to withdraw the film from said reel and to advance the film in a predetermined film path, said transporting unit comprising a driven rotary film advancing member positioned adjacent to said film path and a drive for said rotary member including an endless flexible element having a stretch arranged to move from a first to a second position in response to operation of said unit; a film gate adjacent to a portion of said film path and including a pressing member movable to and from an operative position of engagement with a portion of the film in which the thus-engaged film portion is maintained in a predetermined plane; and motion transmitting means responsive to operation of said transporting unit to move said pressing member from operative position, said motion transmitting means comprising spring-biased tensioning means for normally holding said stretch in first position and an operative connection between said tensioning means and said pressing member to move the latter from operative position in response to movement of said stretch to second position, said operative connection including a lever carrying said tensioning means and rockable about a fixed axis in response to movement of said stretch between said first and second positions and motion receiving means arranged to displace said pressing member in response to rocking of said lever.

2. A mechanism as defined in claim 1, further comprising braking means operative to oppose rotation of said reel when said transporting unit withdraws film therefrom.

3. A mechanism as defined in claim 1, wherein said pressing member comprises a transparent pressing plate and said film gate further includes a frame affixed to said pressing plate and to said motion receiving means and resilient means for urging said motion receiving means against said lever, said motion receiving means comprising at least one projection abutting against said lever.

4. A mechanism as defined in claim 1, wherein said gate further comprises a fixed pressing member defining with said movable pressing member a film channel, and adjusting means for varying the width of said film channel.

5. A mechanism as defined in claim 1, further comprising a second rotary reel arranged to collect film which is being withdrawn from said first mentioned reel.

6. A mechanism as defined in claim 5, wherein each of said reels is rotatable in two directions so that the film can be transferred from either one of said reels onto the other reel, said film transporting unit comprising a reversible drive operative to withdraw film from one of said reels and to convolute the thus withdrawn film onto the other reel, or vice versa, said motion transmitting means being arranged to move said pressing member from operative position in response to operation of said transporting unit to withdraw film from either one of said reels.

7. A mechanism as defined in claim 1, further comprising means for moving said pressing member away from the film portion in said gate independently of said motion transmitting means.

8. A mechanism as defined in claim 7, wherein said gate further comprises a fixed pressing member which cooperates with said movable pressing member to engage said film portion in the operative position of said movable pressing member and wherein said motion transmitting means is arranged to move said movable pressing member away from said fixed pressing member by a distance in the range of 0.1–0.2 mm.

9. A mechanism as defined in claim 8, wherein the means for moving said movable pressing member away from said film portion is arranged to move such movable pressing member to a position at a distance 1–2 mm. from said fixed pressing member.

10. A mechanism as defined in claim 8, wherein said pressing members are transparent.

11. A film guiding and transporting mechanism, particularly for use in microfilm readers, comprising a pair of rotary reels one of which is arranged to accommodate a supply of roll film and the other of which is arranged to collect film which is being withdrawn from said one reel, each of said reels being rotatable in two directions so that the film can be transferred from either one of said reels onto the other reel; a film transporting unit operative to withdraw the film from said one reel and to advance the film in a predetermined film path, said transporting unit comprising a reversible drive operative to withdraw film from one of said reels and to convolute the thus-withdrawn film onto the other reel, or vice versa; a film gate adjacent to a portion of said film path and including a pressing member movable to and from an operative position of engagement with a portion of the film in which the thus-engaged film portion is maintained in a predetermined plane; and motion transmitting means for moving said pressing member from operative position in response to operation of said transporting unit to withdraw film from either one of said reels, said motion transmitting means comprising a two-armed lever rockable about a fixed axis, motion receiving means arranged to move said pressing member from operative position, and a tensioning member mounted on each arm of said lever, said transporting unit comprising an endless flexible element trained around said tensioning members and prime mover means for advancing said flexible element, said flexible element being arranged to rock said lever in response to operation of said prime mover means.

12. A film guiding and transporting mechanism, particularly for use in microfilm readers, comprising a pair of rotary reels one of which is arranged to accommodate a supply of roll film and the other of which is arranged to collect film which is being withdrawn from said one reel, each of said reels being rotatable in two directions so that the film can be transferred from either one of said reels onto the other reel; a film transporting unit operative to withdraw the film from said one reel and to advance the film in a predetermined film path, said transporting unit comprising a reversible drive operative to withdraw film from one of said reels and to convolute the thus withdrawn film onto the other reel, or vice versa; a film gate adjacent to a portion of said film path and including a pressing member movable to and from an operative position of engagement with a portion of the film in which the thus engaged film portion is maintained in a predetermined plane; motion transmitting means for moving said pressing member from operative position in response to operation of said transporting unit to withdraw film from either one of said reels; a spindle for each of said reels; normally idle braking means for each of said spindles; drive means for rotating one of said spindles in response to operation of said transporting unit to withdraw film from the reel on the other spindle; and means for applying the braking means of that spindle whose reel pays out the film.

13. A mechanism as defined in claim 12, wherein each of said braking means comprises a helical spring which contracts in response to rotation of the respective spindle in one direction and thereby opposes rotation of such spindle.

References Cited

UNITED STATES PATENTS

| | | |
|---|---|---|
| 1,944,022 | 1/1934 | Bundick et al. _____ 352—182 |
| 2,724,990 | 11/1955 | Bennett _____ 352—225 XR |
| 2,888,867 | 6/1959 | Suzukawa. |
| 2,903,953 | 9/1959 | Meixner _____ 352—221 XR |
| 3,240,550 | 3/1966 | Mitchell et al. ____ 352—227 XR |
| 3,259,451 | 7/1966 | Fairbanks et al. _____ 352—225 |

FOREIGN PATENTS

| | | |
|---|---|---|
| 1,239,567 | 4/1967 | Germany. |

NORTON ANSHER, Primary Examiner

DAVID S. STALLARD, Assistant Examiner

U.S. Cl. X.R.

352—229